(12) United States Patent
Duncan, Sr.

(10) Patent No.: US 7,650,660 B1
(45) Date of Patent: Jan. 26, 2010

(54) TRAILER SNOW REMOVAL SYSTEM

(76) Inventor: Kevin B. Duncan, Sr., P.O. Box 2112, Upper Darby, PA (US) 19023

( * ) Notice: Subject to any disclaimer, the term of this patent is extended or adjusted under 35 U.S.C. 154(b) by 0 days.

(21) Appl. No.: 12/151,991

(22) Filed: May 12, 2008

(51) Int. Cl.
*B60S 3/04* (2006.01)
(52) U.S. Cl. .......................... 15/97.3; 37/196
(58) Field of Classification Search ............ 37/196, 37/208, 219, 231; 15/3, 97.3; 414/509, 512, 414/513, 527
See application file for complete search history.

(56) References Cited

U.S. PATENT DOCUMENTS

| | | | |
|---|---|---|---|
| 5,802,654 A * | 9/1998 | Yeaglin | 15/97.3 |
| 5,902,090 A * | 5/1999 | Young et al. | 414/527 |
| 6,453,500 B1 * | 9/2002 | Schmitt | 15/97.3 |
| 6,654,978 B2 * | 12/2003 | Bouchard | 15/3 |

* cited by examiner

*Primary Examiner*—Robert E Pezzuto

(57) ABSTRACT

A trailer snow removal system includes a pair of guide members. Each of the guide members is elongated and oriented parallel to each other. An elongated panel has a first end, a second end, an upper edge and a lower edge. The elongated panel extends between the guide members. Each of the first and second ends includes a post that extends downwardly into one of the guide members. A drive assembly is mechanically coupled to each of the lower ends. The drive assembly moves the elongated panel back and forth along the guide members when the drive assembly is turned on. The guide members may be mounted on the top wall to remove snow from the top wall.

3 Claims, 5 Drawing Sheets

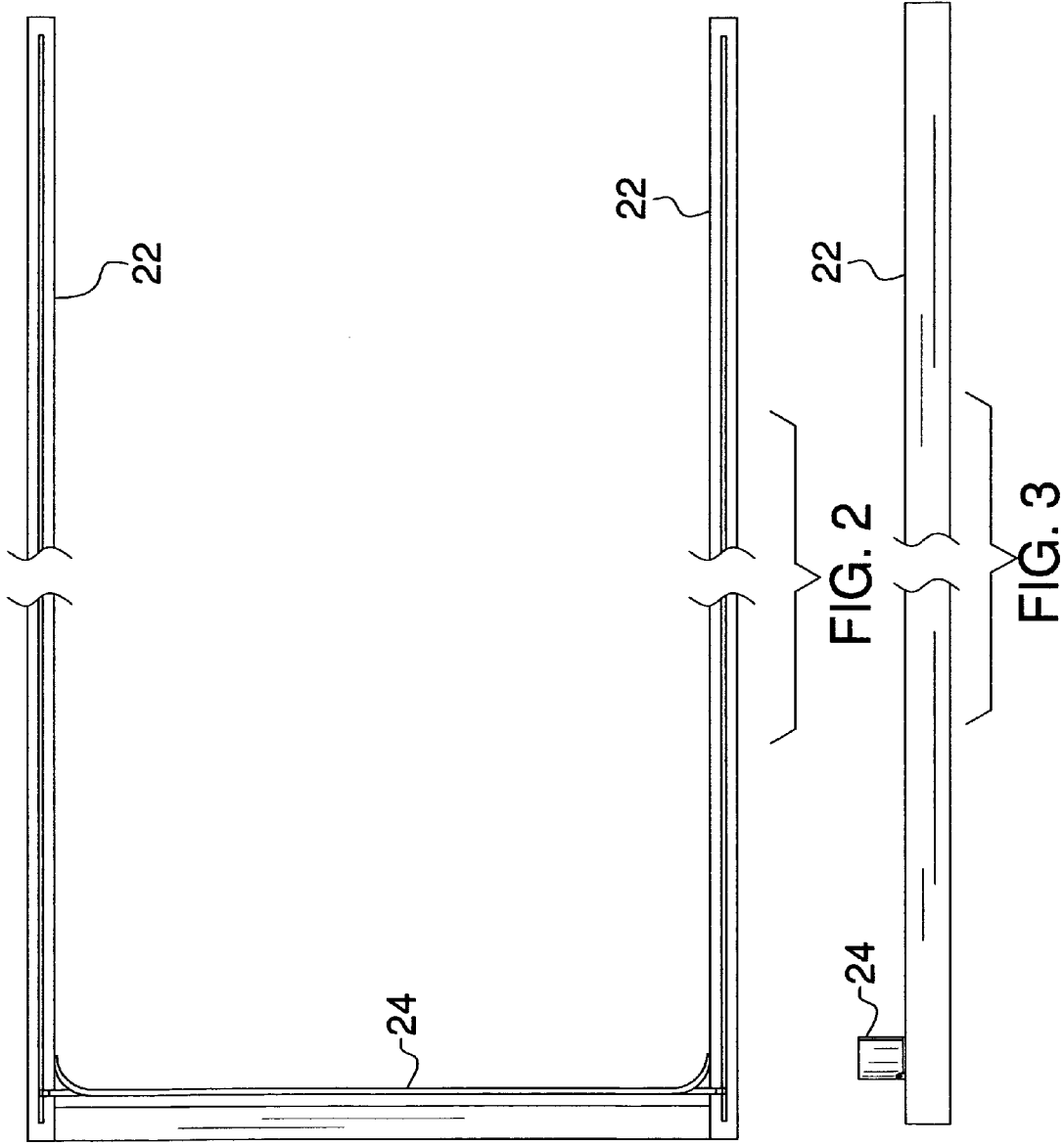

TRAILER SNOW REMOVAL SYSTEM

BACKGROUND OF THE INVENTION

1. Field of the Invention

The present invention relates to snow removal devices and more particularly pertains to a new snow removal device for removing snow and ice from the top wall of a trailer.

2. Summary of the Invention

The present invention meets the needs presented above by generally comprising a pair of guide members. Each of the guide members is elongated and oriented parallel to each other. An elongated panel has a first end, a second end, an upper edge and a lower edge. The elongated panel extends between the guide members. Each of the first and second ends includes a post that extends downwardly into one of the guide members. A drive assembly is mechanically coupled to each of the lower ends. The drive assembly moves the elongated panel back and forth along the guide members when the drive assembly is turned on. The guide members may be mounted on the top wall to remove snow from the top wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top view of the present invention.

FIG. 3 is a side view of the present invention.

DESCRIPTION OF THE PREFERRED EMBODIMENT

Figure 1:
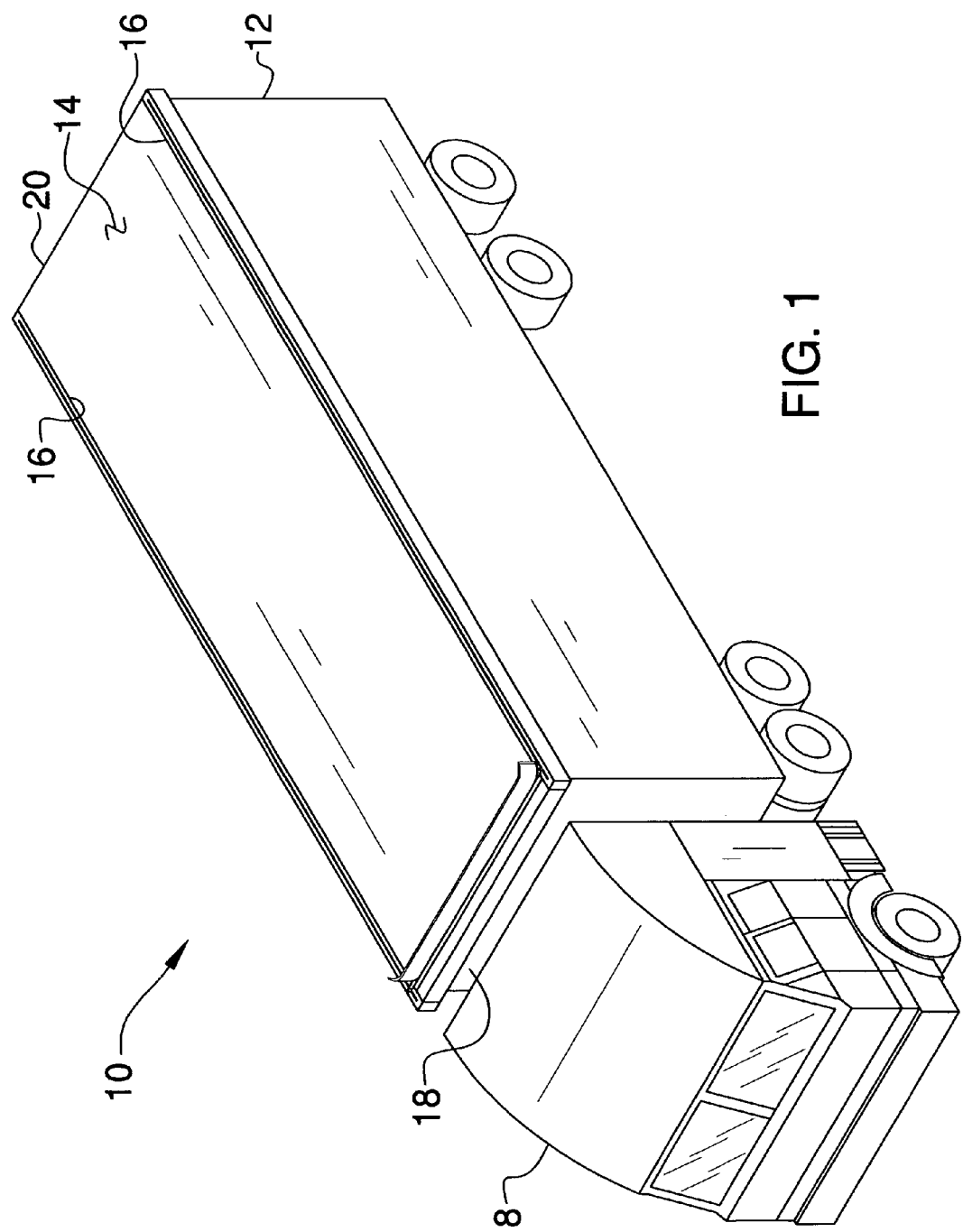
FIG. 1 is a perspective view of a trailer snow removal system according to the present invention.

With reference now to the drawings, and in particular to FIGS. 1 through 6 thereof, a new snow removal device embodying the principles and concepts of the present invention and generally designated by the reference numeral 10 will be described.

As best illustrated in FIGS. 1 through 6, the trailer snow removal system 10 generally comprises a housing 12 that has a top wall 14 and defines a trailer. The top wall 14 has a pair of lateral edges 16, a front edge 18 and a back edge 20.

Figure 4:
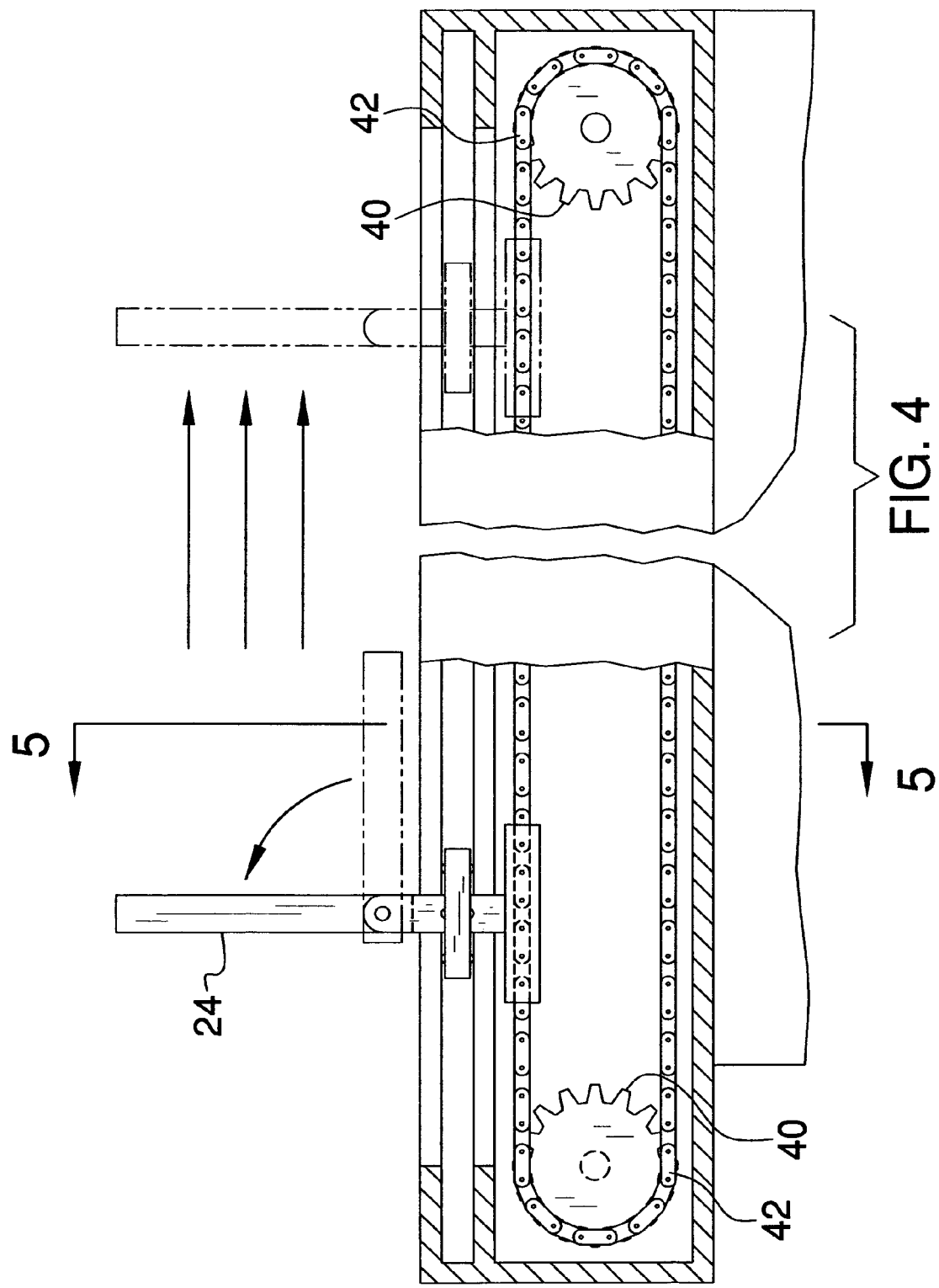
FIG. 4 is a side cross-sectional view of the present invention.
Figure 5:
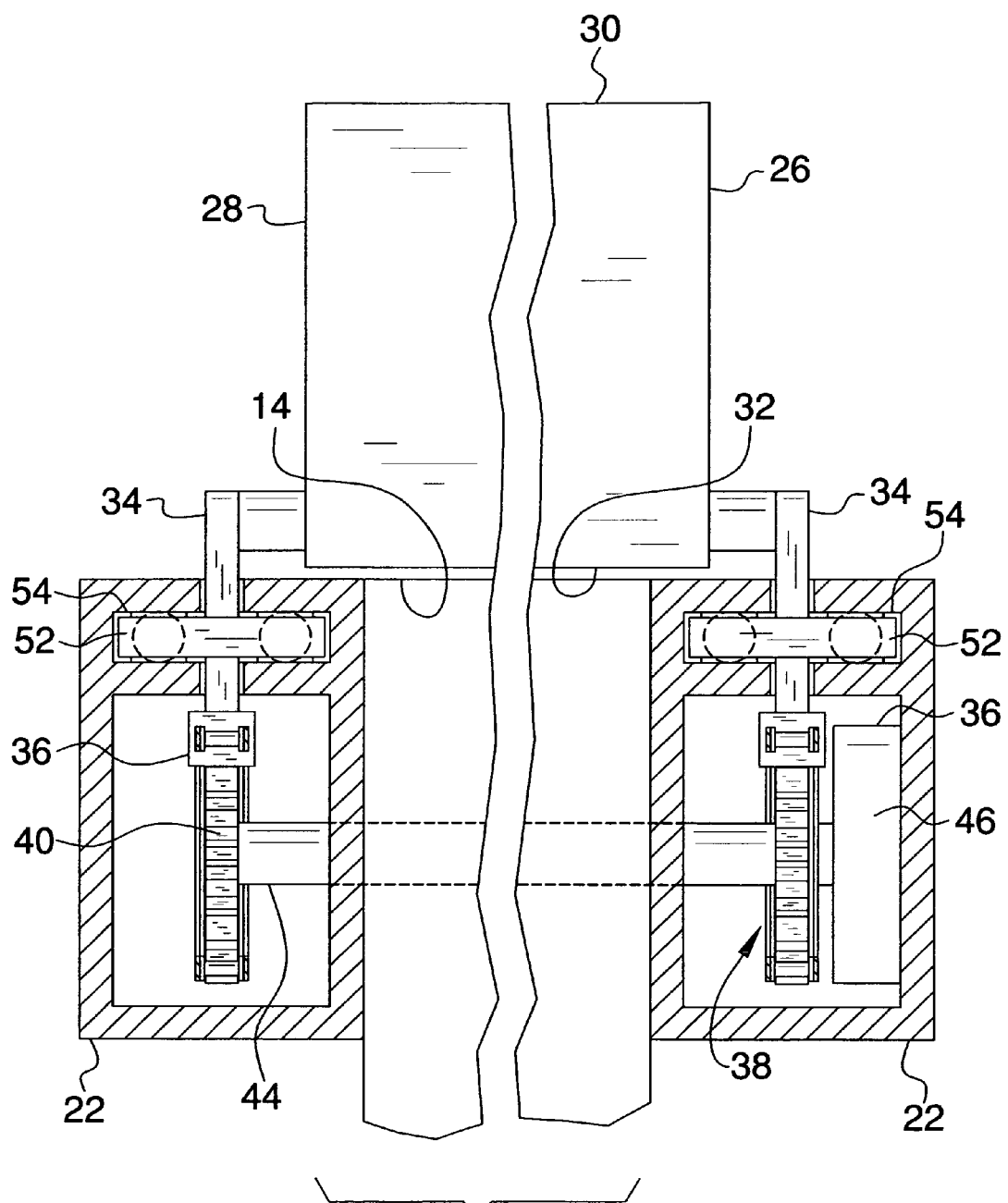
FIG. 5 is a cross-sectional view taken along line 5-5 of FIG. 4 of the present invention.
Figure 6:
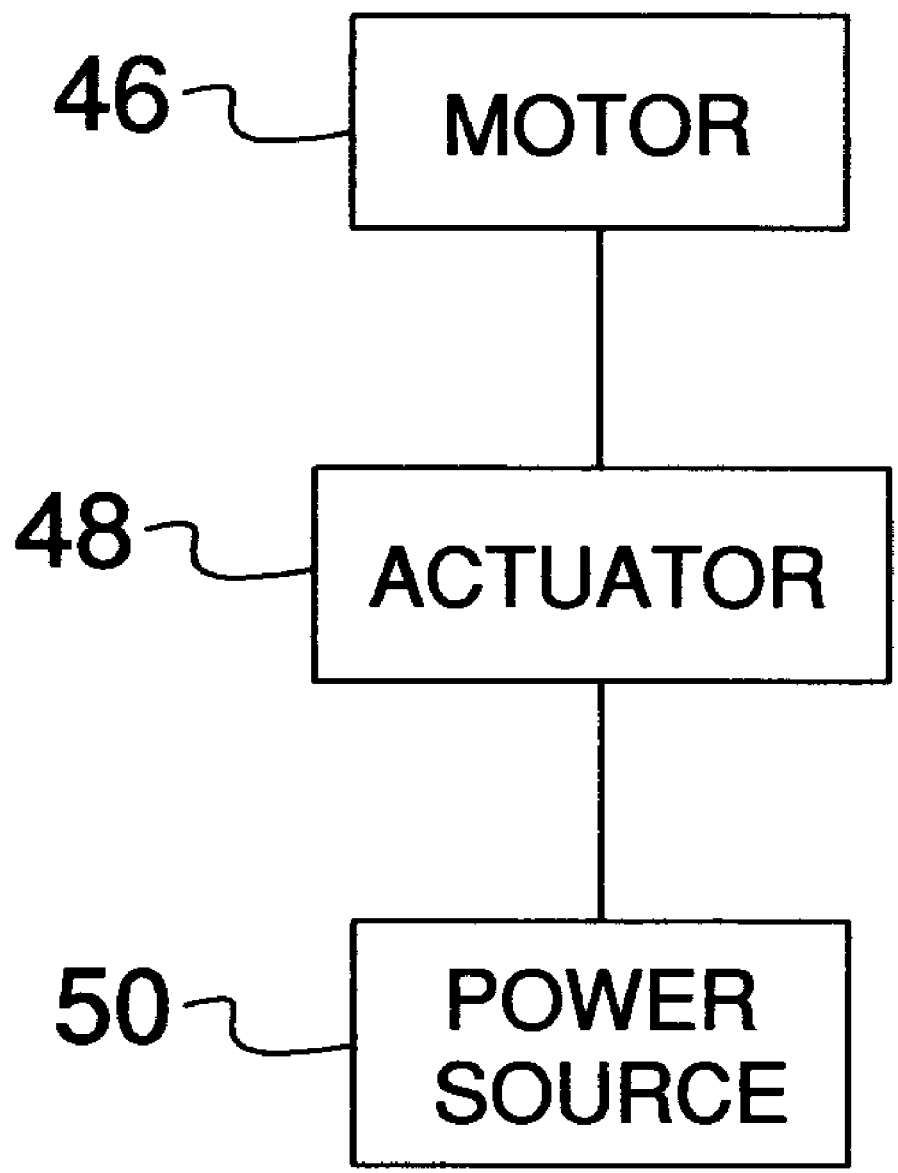
FIG. 6 is a schematic view of the present invention.

A pair of guide members 22 is provided. Each of the guide members is mounted on the housing 12 adjacent to the top wall 14 and are positioned adjacent to and extend along a length of one of the lateral edges 16. An elongated panel 24 has a first end 26, a second end 28, an upper edge 30 and a lower edge 32. The elongated panel 24 extends between the guide members 22 so that the lower edge 32 is positioned adjacent to the top wall 14. Each of the first 26 and second 28 ends includes a post 34 attached thereto extending downwardly into one of the guide members 22. Each of the posts 34 has a lower end 36. As shown in FIG. 4, the panel 24 may be folded downwardly when not in use.

A drive assembly 38 is mechanically coupled to each of the lower ends 36. The drive assembly 38 moves the elongated panel 24 between the front edge 18 and the back edge 20 when the drive assembly 38 is turned on. The drive assembly 38 includes a plurality of gear wheels 40 that are mounted in each of the guide members 22 so that each of the guide members 22 has two gear wheels 40 therein positioned at opposite ends of a respective one of the guide members 22. A pair of chains 42 is provided. Each of the chains 42 is positioned in one of the guide members 22 and is positioned on an associated pair of the gear wheels 40. Each of the lower ends 36 is attached to one of the chains 42. A drive shaft 44 extends between the guide members 22 and is attached to one of the gear wheels 40 in each of the guide members 22. A motor 46 is mechanically coupled to the drive shaft 44. The motor 46 selectively rotates the drive shaft 44 in a first direction or a second direction to move the panel back 24 and forth along the top wall 14. An actuator 48 is operationally coupled to the motor 46 to selectively run the motor 46 in forward or reverse. A power source 50, which may include a battery of a tractor trailer 8, is electrically coupled to the actuator 48.

A pair of bracing members 52 is provided. Each of the bracing members 52 is attached to one of the posts 34. Each of the bracing members 52 is positioned within an elongated slot 54 extending along a length of the guide members 22 and positioned between an upper surface of the guide members and the chains 42. The bracing members 52 prevent the posts 34 from bending while moving along the guide members 22.

In use, after a snowfall, the operator of the tractor trailer 8 can turn on the motor 46 to move the panel 24, which acts as a plow, to remove snow and ice from the top wall 14. This will prevent the snow and ice from blowing off of the housing 12 and striking vehicles when the housing 12 is being pulled along a roadway.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer snow removal system comprising:

a housing having a top wall and defining a trailer, said top wall having a pair of lateral edges, a front edge and a back edge;

a pair of guide members, each of said guide members being mounted on said housing and adjacent to said top wall, each of said guide members being positioned adjacent to and extending along a length of one of said lateral edges;

an elongated panel having a first end, a second end, an upper edge and a lower edge, said elongated panel extending between said guide members, each of said first and second ends including a post attached thereto extending downwardly into one of said guide members, each of said posts having a lower end;

a drive assembly being mechanically coupled to each of said lower ends, said drive assembly moving said elongated panel between said front edge and said back edge when said drive assembly is turned on, said drive assembly including;

a plurality of gear wheels being mounted in each of said guide members so that each of said guide members has two gear wheels therein positioned at opposite ends of a respective one of said guide members;

a pair of chains, each of said chains being positioned in one of said guide members and being positioned on an associated pair of said gear wheels, each of said lower ends being attached to one of said chains;

a drive shaft extending between said guide members and being attached to one of said gear wheels in each of said guide members;

a motor being mechanically coupled to said drive shaft, said motor selectively rotating said drive shaft in a first direction or a second direction to move said panel back and forth along said top wall; and a pair of bracing members, each of said bracing members being attached to one of said posts, each of said bracing members being positioned within an elongated slot extending along a length of said guide members and positioned between an upper surface of said guide members and said chains.

2. The system according to claim 1, wherein said panel has a pair of curved ends curving toward a back end of said housing.

3. A trailer snow removal system for positioning on a top wall of a trailer, said system comprising:

a pair of guide members, each of said guide members being elongated and oriented parallel to each other;

an elongated panel having a first end, a second end, an upper edge and a lower edge, said elongated panel extending between said guide members, each of said first and second ends including a post attached thereto extending downwardly into one of said guide members, said panel having a pair of curved ends curving in a same direction with respect to each other;

a drive assembly being mechanically coupled to each of said lower ends, said drive assembly moving said elongated panel back and forth along said guide members when said drive assembly is turned on; said drive assembly including:

a plurality of gear wheels being mounted in each of said guide members so that each of said guide members has two gear wheels therein positioned at opposite ends of a respective one of said guide members;

a pair of chains, each of said chains being positioned in one of said guide members and being positioned on an associated pair of said gear wheels, each of said posts having a lower end being attached to one of said chains;

a drive shaft extending between said guide members and being attached to one of said gear wheels in each of said guide members;

a motor being mechanically coupled to said drive shaft, said motor selectively rotating said drive shaft in a first direction or a second direction to move said panel back and forth along said top wall;

a pair of bracing members, each of said bracing members being attached to one of said posts, each of said bracing members being positioned within an elongated slot extending along a length of said guide members and positioned between an upper surface of said guide members and said chains; and wherein said guide members may be mounted on the trailer adjacent to the top wall to remove snow from the top wall.

\* \* \* \* \*